(12) United States Patent
Boariu et al.

(10) Patent No.: US 8,724,525 B2
(45) Date of Patent: May 13, 2014

(54) FRAME SYNCHRONIZATION USING BIDIRECTIONAL TRANSIT AND RECEIVE ZONES

(75) Inventors: Adrian Boariu, Irving, TX (US); Shashikant Maheshwari, Irving, TX (US); Tejas Bhatt, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 1256 days.

(21) Appl. No.: 12/204,789

(22) Filed: Sep. 4, 2008

(65) Prior Publication Data

US 2010/0054172 A1    Mar. 4, 2010

(51) Int. Cl.
*H04J 3/00* (2006.01)
(52) U.S. Cl.
USPC ................ 370/280; 370/315; 370/509; 455/7
(58) Field of Classification Search
None
See application file for complete search history.

(56) References Cited

U.S. PATENT DOCUMENTS

| | | | | |
|---|---|---|---|---|
| 6,577,650 B1* | 6/2003 | Tate et al. | ...................... | 370/509 |
| 6,888,806 B1* | 5/2005 | Miller et al. | ................... | 370/316 |
| 2006/0153132 A1* | 7/2006 | Saito | ............... | 370/329 |
| 2008/0080448 A1* | 4/2008 | Rottinghaus | ................... | 370/342 |
| 2008/0095038 A1* | 4/2008 | Chang et al. | ................... | 370/208 |
| 2008/0113616 A1* | 5/2008 | Kim et al. | ......................... | 455/7 |
| 2010/0278083 A1* | 11/2010 | Kwak et al. | .................... | 370/280 |

FOREIGN PATENT DOCUMENTS

EP          1777877 A2    4/2007

OTHER PUBLICATIONS

Hamiti, Shkumbin "The Draft IEEE 802.16m System Description Document", IEEE 802.16 Broadband Wireless Access Working Group<http://ieee802.org/16>, IEEE 802.16m-08/003r3,(Jun. 16, 2008), 56 pgs.
Nagaraj, Shirish et al., "IEEE 802.16m UL Common Feedback", IEEE C802.16m-08/275, TGm—Call for contributions on Project 802.16m System Description Document—IEEE 802.16m-08/016r1 (Uplink Control Structures),(May 5, 2008), 8 pgs.
Cudak, Mark "IEEE 802.16m System Requirements", IEEE 802.16 Broadband Wireless Access Working Group <http://ieee802.org/16>, IEEE 802.16m-07/002r4,(Oct. 19, 2007), 26 pgs.
"Part 11: Wireless LAN Medium Access Control (MAC) and Physical Layer (PHY) Specifications", IEEE Standard for Information Technology—Telecommunications and information exchange between systems—Local and metropolitan area networks—Specific requirements, IEEE Computer Society, IEEE Std. 802.11-2007, Jun. 12, 2007, 1232 pages.
Gamini, Senarath, et al, "Frame Alignment Requirements in Relays", IEEE 802.16 Broadband Wireless Access Working Group, Mar. 5, 2007, 8 pages.
Viorel, Dorin, et al, "On the issue of frame alignment and time gaps", IEEE 802.16 Broadband Wireless Access Working Group, Nov. 14, 2007, 5 pages.
International Search Report and Written Opinion for International Application No. PCT/EP2009/061467, mailed on Jan. 29, 2010, 15 pages.

* cited by examiner

*Primary Examiner* — Andrew Lai
*Assistant Examiner* — Leon Andrews
(74) *Attorney, Agent, or Firm* — Brake Hughes Bellermann LLP

(57) ABSTRACT

Methods and apparatus for synchronizing frames in wireless networks are disclosed. An example method includes delaying, at a wireless relay station, a start time of a frame. In the example method, the start time of the frame is delayed, such that the relay station receives one or more data symbols from a superordinate wireless station and one or more data symbols from a subordinate wireless station at substantially the same time during the frame.

32 Claims, 13 Drawing Sheets

FRAME SYNCHRONIZATION USING BIDIRECTIONAL TRANSIT AND RECEIVE ZONES

FIELD

This disclosure relates to wireless networks.

BACKGROUND

As wireless technology has advanced, a variety of different types of wireless networks have been installed, such as cellular and other wireless networks. Some wireless networks are based upon the Institute of Electrical and Electronics Engineers (IEEE) 802.11 family of Wireless LAN (WLAN) industry specifications, for example. Other wireless technologies are being developed, such as IEEE 802.16 or WiMax industry specifications. IEEE 802.16 defines the Wireless MAN air interface specification for wireless metropolitan area networks. A number of working groups are working to continually improve this technology.

One proposed amendment to the 802.16 specification is the implementation of bidirectional transmit and receive zones for relay stations (RSs) implemented in 802.16 networks. In a RS bidirectional transmit zone, a RS would simultaneously transmit upstream to a superordinate station (e.g., base station or other RS) and transmit downstream data to its subordinate stations (e.g., one or more mobile stations and/or other RSs).

Similarly, in a RS bidirectional receive zone, a RS would simultaneously receive downstream data from its superordinate station and receive upstream data from its subordinate stations. However, implementation of such RS bidirectional zones violates the time division duplex synchronization for data frames transmitted in 802.16 networks.

SUMMARY

Various embodiments are disclosed relating to frame synchronization using bidirectional transmit and receive zones. While specific examples relating to 802.16 networks are discussed, it will be appreciated that the techniques described herein may be applied to any number of wireless networks using multiple hops to transmit data between wireless devices, such as between a base station and a mobile station via a relay station.

According to an example embodiment, a method may include delaying, at a wireless relay station, a start time of a frame. In the example method, the start time of the frame may be delayed, such that the relay station receives one or more data symbols from a superordinate wireless station and one or more data symbols from a subordinate wireless station at substantially the same time during the frame.

According to another example embodiment, a method may include advancing a start time of a frame. The frame may include a plurality of sequential zones separated by respective transition times, where the transition times are nominally substantially equivalent to a transmission time for a single data symbol. The example method may further include increasing a first transition time from nominal and decreasing a second transition time from nominal. In the example method, the advancing, increasing and decreasing may synchronize the frame with a superordinate wireless station and a subordinate wireless station, such that the relay station transmits one or more data symbols to the superordinate station and one or more data symbols to the subordinate station at substantially the same time during the frame.

According to yet another example embodiment, a method may include delaying, at a relay station, a start time of a frame. In the example method, the frame may include a plurality of zones separated by respective transition times, where the transition times are nominally substantially equivalent to a transmission time for a single data symbol. The method may further include decreasing a first transition time from nominal and instructing a subordinate wireless station to modify its timing based on the decrease in the first transition time.

In the example method, the delaying, decreasing and instructing may synchronize the frame with a superordinate wireless station and the subordinate station, such that the relay station receives one or more data symbols from the superordinate station and one or more data symbols from the subordinate station at substantially the same time during a first portion of the frame. The delaying, decreasing and instructing may also synchronize the frame with the superordinate station and the subordinate station, such that the relay station transmits one or more data symbols to the superordinate station and one or more data symbols to the subordinate station at substantially the same time during a second portion of the frame.

According to still another example embodiment, a method may include aligning, at a relay station, a start time of a frame with a frame start time of a superordinate wireless station. In the example method, the frame may include a plurality of zones separated by respective transition times, where the transition times are nominally substantially equivalent to a transmission time for a single data symbol. The example method may also include increasing a first transition time from nominal and decreasing a second transition time from nominal. The example method may further include instructing a subordinate wireless station to modify its timing based on the increase in the first transition time and the decrease in the second transition time.

In the example method, the aligning, increasing, decreasing and instructing may synchronize the frame with the superordinate station and the subordinate station, such that the relay station receives one or more data symbols from the superordinate station and one or more data symbols from the subordinate station at substantially the same time during a first portion of the frame. Also in the example method, the aligning, increasing, decreasing and instructing may synchronize the frame with the superordinate station and the subordinate station, such that the relay station transmits one or more data symbols to the superordinate station and one or more data symbols to the subordinate station at substantially the same time during a second portion of the frame.

According to another example embodiment, an apparatus may include a wireless transceiver, a controller operatively coupled with the wireless transceiver and a memory operatively coupled with the controller. In the example apparatus, the wireless transceiver, the controller and the memory may be collectively configured to delay a start time of a frame, such that the apparatus receives one or more data symbols from a superordinate wireless station and one or more data symbols from a subordinate wireless station at substantially the same time during the frame.

According to still another example embodiment, an apparatus may include a wireless transceiver, a controller operatively coupled with the wireless transceiver and a memory operatively coupled with the controller. In the example apparatus, the wireless transceiver, the controller and the memory may be collectively configured to advance a start time of a frame, where the frame may include a plurality of sequential zones separated by respective transition times. In the example apparatus, the transition times may be nominally substantially equivalent to a transmission time for a single data symbol.

In the example apparatus, the wireless transceiver, the controller and the memory may be further collectively configured to increase a first transition time from nominal and decrease a second transition time from nominal. The advancing, increasing and decreasing may synchronize the frame with a superordinate wireless station and a subordinate wireless station such that the apparatus transmits one or more data symbols to the superordinate station and one or more data symbols to the subordinate station at substantially the same time during the frame.

According to yet another example embodiment, an apparatus may include a wireless transceiver, a controller operatively coupled with the wireless transceiver and a memory operatively coupled with the controller. In the example apparatus, the wireless transceiver, the controller and the memory may be collectively configured to align a start time of a frame with a frame start time of a superordinate wireless station. In the example apparatus, the frame may include a plurality of zones separated by respective transition times, where the transition times are nominally substantially equivalent to a transmission time for a single data symbol. The wireless transceiver, the controller and the memory may be further collectively configured to increase a first transition time from nominal, decrease a second transition time from nominal and instruct a subordinate wireless station to modify its timing based on the increase in the first transition time and the decrease in the second transition time.

In the example apparatus, the advancing, increasing, decreasing and instructing may synchronize the frame with the superordinate station and the subordinate station such that the apparatus receives one or more data symbols from the superordinate station and one or more data symbols from the subordinate station at substantially the same time during a first portion of the frame. The advancing, increasing, decreasing and instructing may also synchronize the frame with the superordinate station and the subordinate station such that the apparatus transmits one or more data symbols to the superordinate station and one or more data symbols to the subordinate station at substantially the same time during a second portion of the frame.

The details of one or more example embodiments are set forth in the accompanying drawings and the description below. Other features will be apparent from the description and drawings, and from the claims.

DETAILED DESCRIPTION

Figure 1:
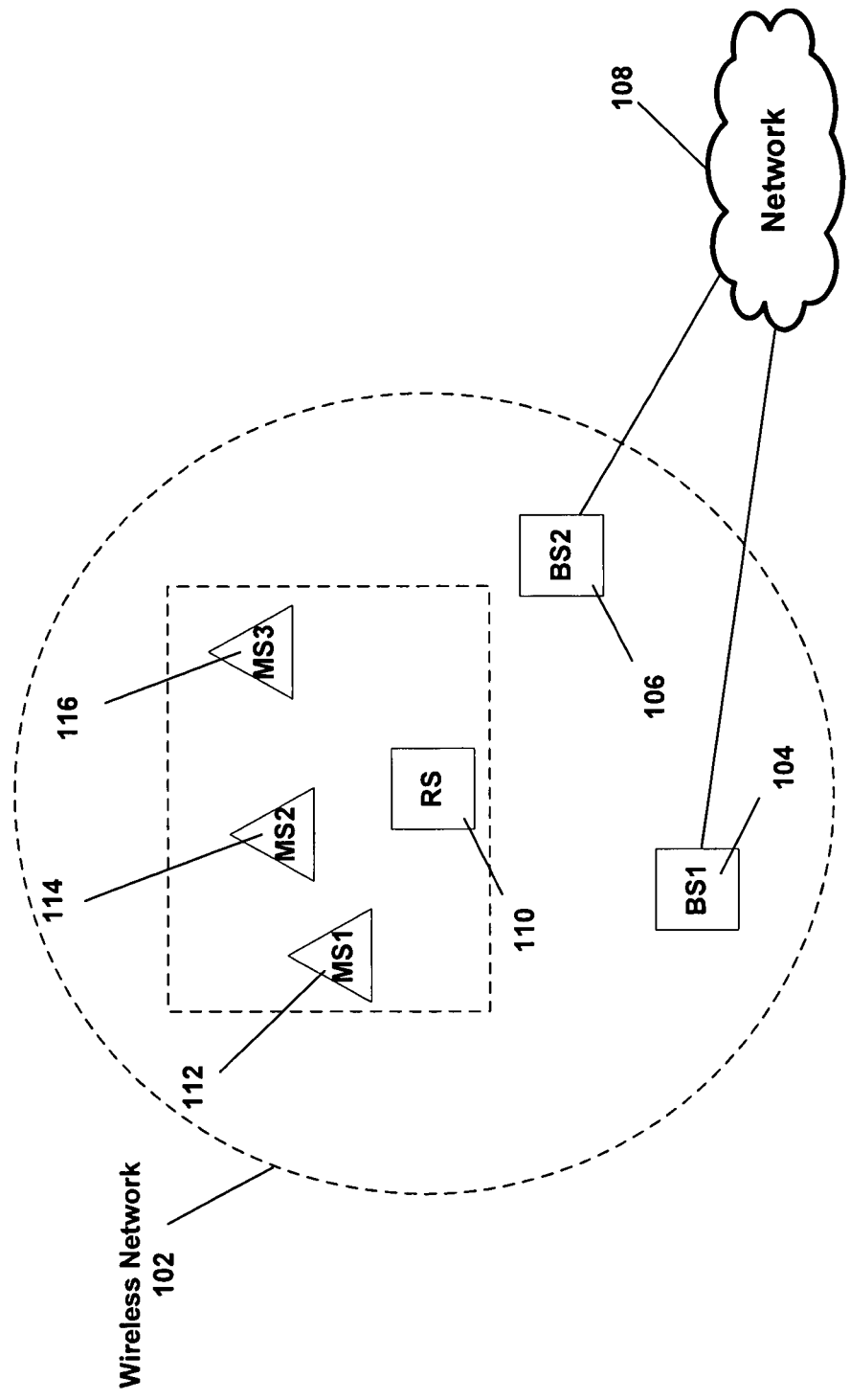
FIG. 1 is a block diagram illustrating a wireless network according to an example embodiment.

Referring to the Figures in which like numerals indicate like elements, FIG. 1 is a block diagram illustrating a wireless network 102 according to an example embodiment. Wireless network 102 may include a number of wireless nodes or stations, such as base stations (BSs) BS1 104 and BS2 106, a relay station (RS) 110, and a group of mobile stations (MSs), such as MS1 112, MS2 114, and MS3 116. While only two BSs, one MS, and three MSs are shown in wireless network 102, any number of BSs, RSs, and MSs may be provided. Each BS 104, 106 may be coupled to a fixed network 108, such as a Wide Area Network (WAN), the Internet, etc., and may also be coupled to other wireless networks. The group of MSs MS1 112, MS2 114, and MS3 116 may communicate with a BS 104 or 106 via the RS 110.

According to an example embodiment, MSs MS1 112, MS2 114, and MS3 116 may be associated with BS BS1 104 or BS2 106, for example, and the mobile stations may communicate with BS1 104 or BS2 106 via relay station 110. Furthermore, additional mobile stations or subscriber stations (not shown) may communicate directly with the BSs 104 and/or 106.

The various embodiments described herein may be applicable to a wide variety of networks and technologies, such as WLAN networks, 802.11 networks, WiMAX networks, IEEE 802.16 type networks, cellular networks, radio networks, or other wireless networks. A wireless relay network may be an example of a multi-hop system in which end nodes, for example, MSs or subscriber stations, may be connected to the BS via the RS, such as RS 110, for example. Traffic between the MSs or subscriber stations and the BS may pass through, and be processed by, the RS 110, for example. As an example, a RS may be used to extend the network coverage and/or enhance the system throughput. For example, the traffic sent from a RS may be scheduled by the RS itself or scheduled by the BS instead. In some cases, a RS may receive and decode a frame from a BS, and then forward the frame to a respective MS or subscriber station. In the wireless network 102, the RS 110 may implement bidirectional zones (e.g., transmit and/or receive) using the techniques discussed below.

Figure 2:
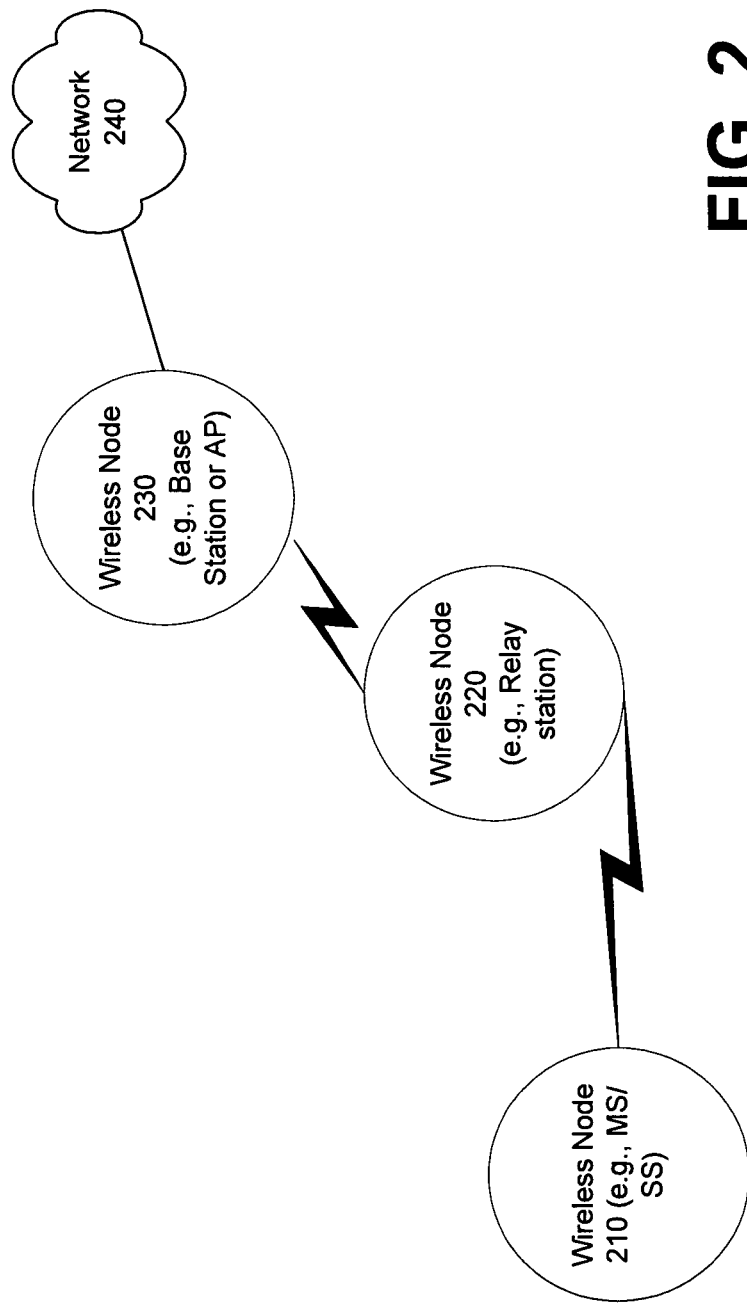
FIG. 2 is a diagram of an example multi-hop environment according to an embodiment.

FIG. 2 is a diagram of a multi-hop environment according to an example embodiment. In FIG. 2, a wireless node 210, which may be a MS or subscriber station (MS/SS), may be coupled, via a wireless link, to a wireless node 220. As an example, the wireless node 210 may include a mobile telephone, a wireless personal digital assistant (PDA), or any number of other types of wireless access device, or MS (MS).

The term "node" may refer, for example, to a wireless station, e.g., a subscriber station or MS, an access point or BS, a RS or other intermediate wireless node, or other wireless computing device, as some examples. Wireless node 220 may be, for example, a RS or other node, which may implement bidirectional zones, as described herein. Wireless node 220 may be coupled to a wireless node 230 via a wireless link. Wireless node 230 may be, for example, a BS (BS), access point (AP) or other wireless node. Frames or data flowing from node 210 to node 220 to node 230 may be referred to as the uplink (UL) or upstream direction, whereas frames flowing from node 230 to node 220 and then to node 210 may be referred to as the downlink (DL) or downstream direction, for example. The node 230 may be further coupled with an external network 240, e.g., the Internet.

Figure 3:
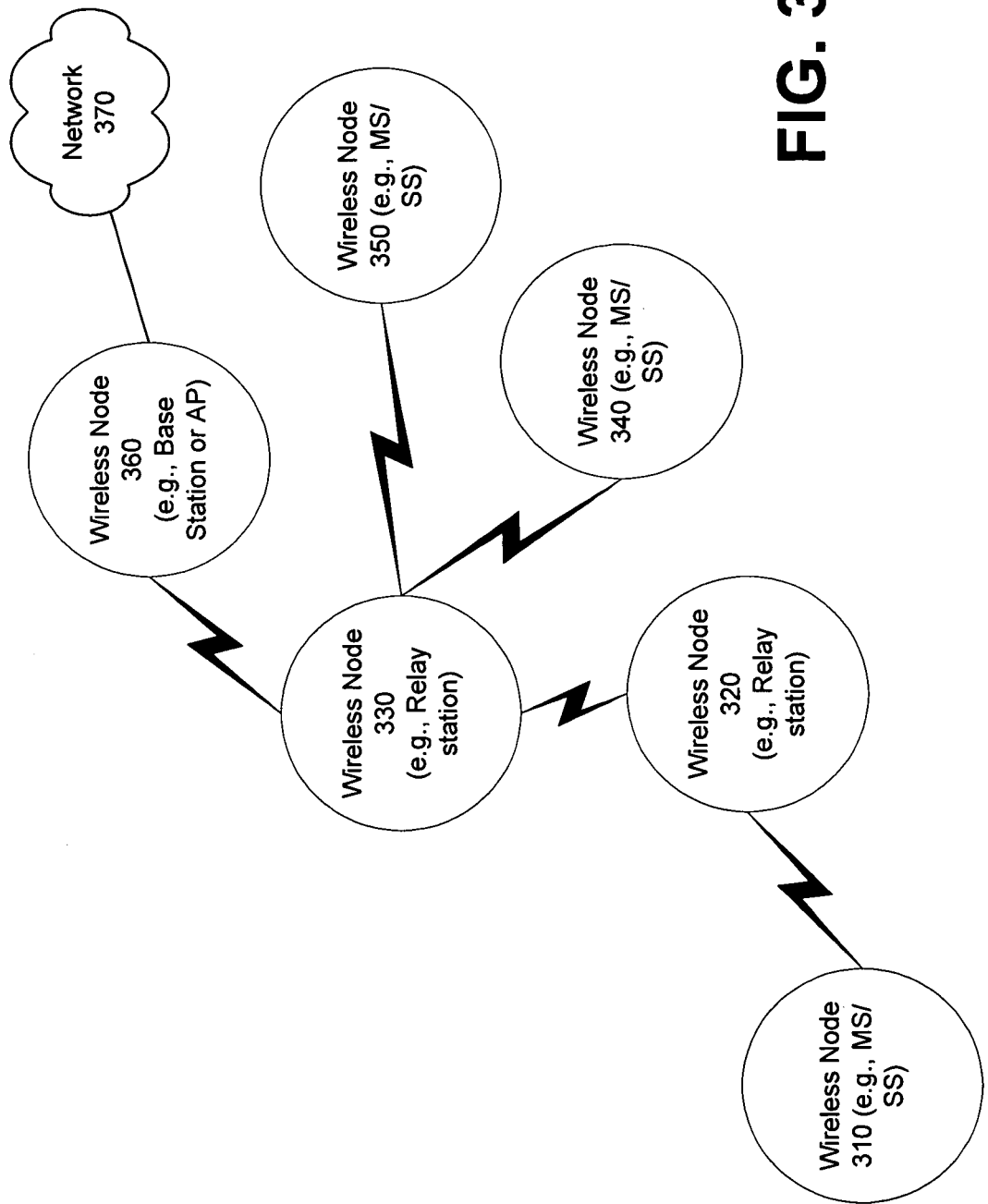
FIG. 3 is a diagram illustrating another example multi-hop environment according to an embodiment.

FIG. 3 is a diagram illustrating another multi-hop environment according to another example embodiment. The configuration illustrated in FIG. 3 is similar to the configuration illustrated in FIG. 2. In FIG. 3, a wireless node 310, which may be a MS or subscriber station (MS/SS), may be coupled via a wireless link to a wireless node 320. The wireless node 320 may be, e.g., a RS. The node 320 may be coupled via wireless link with a wireless node 330, which may also be a RS. In the arrangement illustrated in FIG. 3, the wireless nodes 320 and 330 may both implement bidirectional transmit and/or receive zones using the approaches described herein.

The wireless node 330 may be coupled, via respective wireless links, with wireless nodes 340 and 350, which may be MSs or subscriber stations. The wireless node 330 may also be coupled, via a wireless link, with a wireless node 360, which may be a BS or access point, for example. In turn, the wireless node 360 may be coupled with an outside network 370, such as the Internet, for example. In FIG. 3, the wireless nodes 320 and 330 may both implement bidirectional transmit and/or receive zones, such as described herein.

Figure 4:
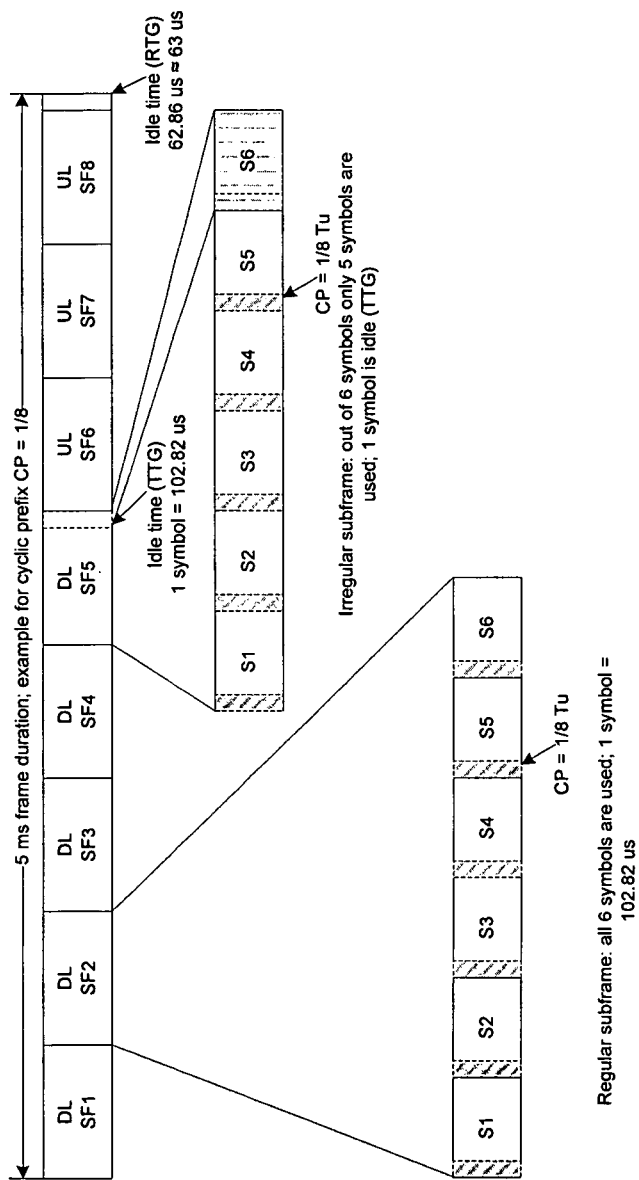
FIG. 4 is a diagram illustrating a frame structure according to another example embodiment.

FIG. 4 is a diagram illustrating an example frame structure for data communication in an 802.16 network. This frame structure is merely an example frame structure and any number of other frame configurations are possible depending on the particular embodiment and/or the wireless node in which such a frame is employed. These techniques may also be implemented in other wireless networks and are not limited to use in 802.16 networks.

As illustrated in FIG. 4, a frame may include a downlink (DL) portion and an uplink (UL) portion. As shown in FIG. 4, the frame may be five milliseconds in duration and include eight subframes (SF1-SF8), including four DL subframes and four UL subframes. As is also shown in FIG. 4, up to six data symbols (e.g., orthogonal frequency division multiplex (OFDM) symbols) may be transmitted in each subframe. In this example, an OFDM symbol has a transmission duration of ~102.82 µs with forty-eight symbols per frame. Transmission of each OFDM symbol in the frame illustrated in FIG. 4 is preceded by a cyclic prefix (CP) which is one-eighth of the symbol duration (CP=1/8*Tu, where Tu is the transmission duration of one OFDM symbol). A data symbol is not read during the CP. This approach prevents inter-symbol interference by providing setup time between symbols.

As is also shown in FIG. 4, one or more symbols of a subframe (e.g., at the end of a subframe) may be used as idle time (i.e., a symbol is not transmitted during a designated symbol slot). The idle time, therefore, may be nominally equivalent to an integer multiple of a transmission time of a single OFDM symbol, which in this example is ~102.82 µs per symbol. Such a transition time may be used when a wireless node is switching from a transmit mode to a receive mode (or vice versa). In FIG. 4, a transmit-to-receive transition gap (TTG) is shown at the end of SF5. In this situation, the sixth OFDM symbol (S6) of SF5 would be an idle time (e.g., no symbol would be transmitted) to allow an associated wireless node (e.g., BS, RS or wireless station) to transition from a transmit mode to a receive mode.

Similarly, a receive to transmit transition gap (RTG) may be used as a transition time between a receive mode and a transmit mode for a wireless node. Typically, however, an RTG may be less than a TTG because a wireless node associated with the frame generally does not need to account for propagation delays when switching from receive to transmit mode. As shown in FIG. 4, the idle time at the end of the 5 ms frame [which is the residual of 5 ms after the forty-eight OFDM symbols (~63 us)] may be referred to as an RTG because there is a transition between a receive mode (e.g., UL at the end of the frame) and a transmit mode (e.g., DL at the beginning of the next frame). Nevertheless, an RTG within a frame (i.e., between subframes) is generally the duration of a transmission time for an OFDM symbol. For instance, an idle time (symbol) may be used in a similar fashion as a TTG, which was discussed above. An OFDM symbol transmission time is used for TTG and RTG in order to maintain synchronization between wireless nodes in a network. For example, synchronization in 802.16 networks is based on integer multiples of OFDM symbol transmission times.

However, implementing bidirectional zones (receive and/or transmit zones) in a RS (e.g., in an 802.16 network) does not allow for the use of transition gaps (TTG and RTG) with a duration that is substantially equal to a transmission time for one data symbol (e.g., ~102.82 µs for a single OFDM symbol in an 802.16 network). Accordingly, changes to the frame timing and synchronization of wireless nodes operating in such a network may be desirable in order to implement such bidirectional zones.

FIGS. 5-8 are timing diagrams illustrating various embodiments for implementing bidirectional transmit and/or receive zones in a RS. The timing in FIGS. 5-8 is discussed with respect to a BS, a RS and an MS. It will be appreciated that these labels are given by way of example and other combinations of wireless nodes may use the illustrated techniques. For instance, these techniques may be implemented in the network of FIG. 3, where two relay stations may be implemented between a BS and a MS. Also, the techniques shown in FIGS. 5-8 are included in the flowcharts of FIG. 9-12. Accordingly, the timing of the BS frames, RS frames and MS frames of the timing diagrams of FIGS. 5-8 will be generally described and then discussed in further detail with respect to FIGS. 9-12. As described herein, the various techniques for implementing bidirectional zones (transmit and/or receive) may be described with reference to a RS, a superordinate station (an upstream station to the RS) and a subordinate station (a downstream station to the RS).

Figure 5:
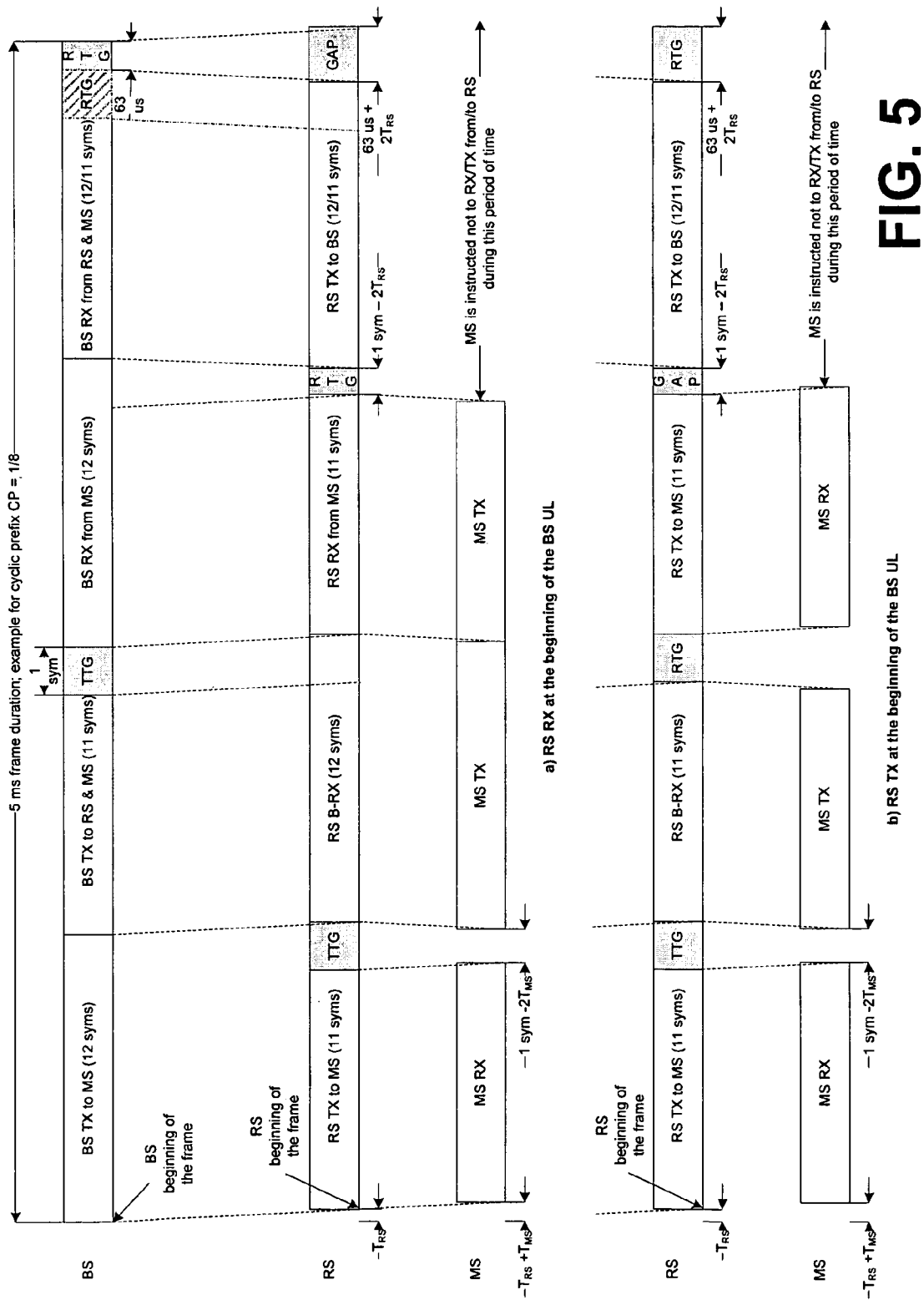
FIG. 5 is a timing diagram illustrating frame synchronization for a relay station implementing a bidirectional receive zone according to two example embodiments.

FIG. 5 is a timing diagram illustrating two embodiments of frame synchronization for a 5 ms frame, where a bidirectional receive zone is implemented by a RS. FIG. 5 illustrates superordinate station (e.g., BS) timing in the top row, which is the same for both example embodiments illustrated in FIG. 5. The second and third rows of FIG. 5 illustrate, respectively, RS and subordinate station (e.g., MS) timing for a first embodiment (example a), while the fourth and fifth rows illustrate respective RS and MS timing for a second embodiment (example b).

As shown in FIG. 5, each frame is separated into four sequential zones for each of the wireless nodes (BS, RS and MS) illustrated in FIG. 5. The timing for the BS will be described first and then the timing of the RS and MS will be described for each of the two embodiments. In the embodiments illustrated in FIG. 5, only the timing of the RS is changed (e.g., as compared to current frame synchronization timing in an 802.16 network). The timing of the mobile station is not modified and synchronization for the MS with the RS is based on integer multiples of OFDM symbols, in like fashion as was discussed above.

As shown in the first row of FIG. 5, in a first sequential zone of the frame, the BS may transmit to MSs that are locally connected to the BS. In this example embodiment, the BS may transmit twelve OFDM symbols (two subframes) to locally connected MSs. In a second sequential zone (the bidirectional receive zone for the RS in both examples), the BS may transmit to both locally connected MSs as well as the RS. As shown in FIG. 5, eleven symbols may be transmitted in the second zone, while one idle symbol is used for a TTG These twelve symbols (eleven symbols plus one idle symbol) correspond to two subframes.

In a third sequential zone, the BS may receive twelve symbols (two subframes) from its locally connected MSs. In a fourth sequential zone of the BS frame, the BS may receive data symbols from its locally connected MSs, as well as from RSs coupled with the BS via respective wireless links. Depending on the particular embodiment, eleven symbols and one idle symbol may be communicated in the fourth zone, where an RTG of one OFDM symbol may be used in addition to the residual time (~63 μs) at the end of the BS frame. Alternatively, the residual time may be used as the RTG (to the start of the next BS frame) and twelve OFDM symbols may be communicated to the BS from the locally connected MSs and the RS in the fourth zone of the BS frame.

In first example (a) of FIG. 5, the second and third rows illustrate a first example embodiment of timing for an RS and MS, where the RS implements a bidirectional receive zone in a sequentially second zone of its frame. As shown in FIG. 5, the start of the RS frame may be delayed by a time $T_{RS}$, which is a propagation delay time between the BS and the RS. In an example embodiment, the delay of the start of the RS frame may be coordinated with the BS in a number of ways. For instance, global positioning system information may be used to determine the distance between the RS and the BS and the propagation delay may be determined based on that distance. Alternatively, the RS and BS may perform a ranging operation by communicating over relay link to calculate the propagation delay.

In this example, as shown in FIG. 5, a sequentially first zone of the RS frame may include transmitting eleven OFDM symbols to the MS. An idle symbol (to complete two subframes) may be included at the end of the first zone of the RS frame as a TTG between the first zone and a sequentially second zone. In the second zone of this example, the RS may implement a bidirectional receive zone, where the RS receives twelve OFDM symbols from the MS on a first carrier frequency (e.g., a portion of the first carrier frequency) and receives the eleven OFDM symbols transmitted by the BS in the second zone on a second carrier frequency (or a different portion of the first carrier frequency than the portion used by the MS).

In this first example of RS timing in FIG. 5, the RS may receive eleven data symbols from the MS in a sequentially third zone of its frame. Because the RS remains in the receive mode in the third zone (from the second zone), there is no need for a transition gap and the transition time from the second zone to the third zone of the RS frame may be zero. In this example, the RS transmits eleven or twelve OFDM symbols to the BS in a sequentially fourth zone of the RS frame. The number of symbols depends on whether an idle symbol is used at the end of the frame or if only the residual time of ~63 μs plus $2T_{RS}$ (which is a round trip delay between the BS and the RS) is used as a transition gap to the start of the next frame. Also, in order to account for the delayed start of the RS frame and the bidirectional zone in the second zone, the RTG between the third zone and the fourth zone of the RS frame is reduced by $2T_{RS}$. This change results in the additional $2T_{RS}$ of residual time at the end of the RS frame mentioned above.

As is shown in FIG. 5, for this first example, the MS is instructed not to transmit or receive data symbols in its fourth zone. Thus, in this example, the MS is idle in its fourth zone in order to account for the delay of the start of the RS frame and the implementation of the bidirectional receive zone in the second zone of the RS frame. If the MS was not instructed to be idle in its fourth zone, the synchronization of the MS frame based on integer multiples of OFDM symbol transmission times would be violated.

The overall timing of the MS frame in this example is not otherwise modified (e.g., for an 802.16 network) other than the shift of the MS frame due to the delay of the start of the RS frame by $T_{RS}$. This shift, however, is transparent to the MS as its timing is relative to the RS frame. Accordingly, for purposes of brevity, the MS frame timing is not discussed in detail here. However, it is noted that the MS knows the propagation delay ($T_{MS}$) between the RS and the MS and may account for this delay in its timing in order to maintain synchronization of the MS frame with the RS based on integer multiples of OFDM symbol transmission times. The MS transmits and receives data symbols in each zone of its frame as is shown in the third row of FIG. 5 for this example.

For the second example embodiment illustrated in FIG. 5 (example b), the timing of the BS frame is the same as described above. The timing/zoning of the RS is slightly modified as compared to the first example embodiment (example a) discussed above. In the second example (b) of FIG. 5, the RS transmits data symbols to the MS in the third zone of its frame rather than receiving data symbols from the MS in the third zone. Accordingly, there is a one idle symbol (TTG) included at the end of the second zone (the bidirectional receive zone) of the RS frame in the second example (b). Accordingly, the RS only receives eleven symbols (rather than twelve) from the MS during the bidirectional receive zone in this second example.

Figure 6:
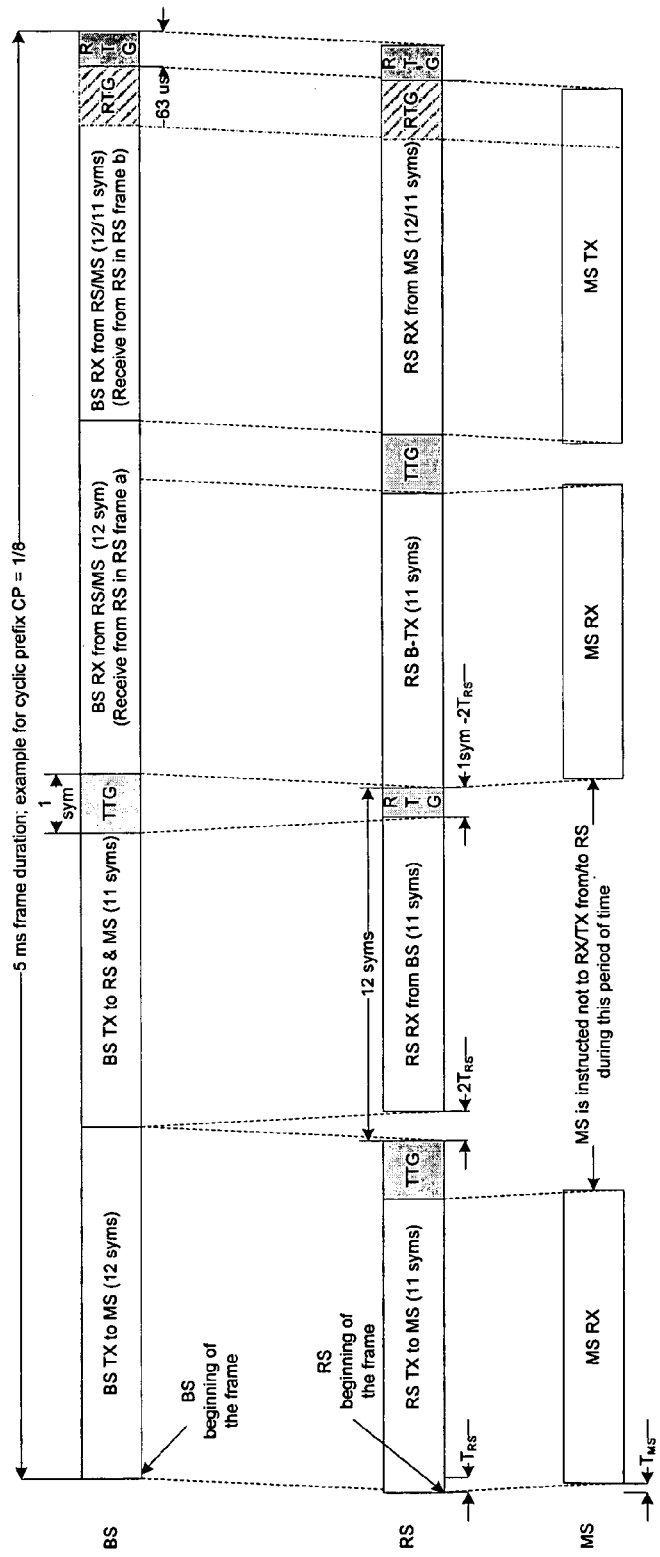
FIG. 6 is a timing diagram illustrating frame synchronization for a relay station implementing a bidirectional transmit zone according to two example embodiments.
Figure 6:
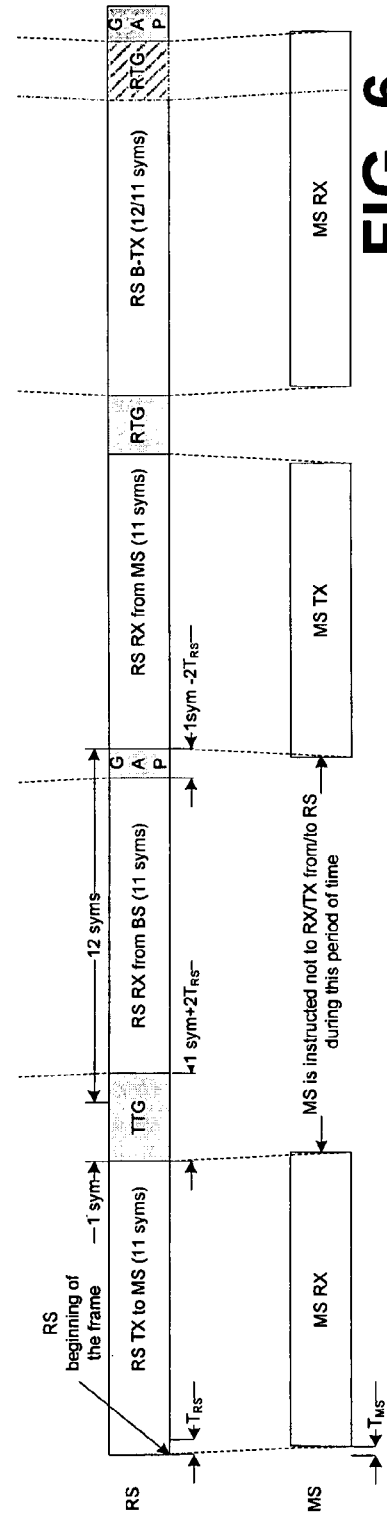

FIG. 6 is a timing diagram illustrating frame synchronization for a relay station implementing a bidirectional transmit zone according to two example embodiments. In similar fashion as FIG. 5, FIG. 6 illustrates BS timing in the top row, which is the same for both example embodiments illustrated in FIG. 6. The second and third rows of FIG. 6 illustrate, respectively, RS and MS timing for a first embodiment (example a), while the fourth and fifth rows illustrate respective RS and MS timing for a second embodiment (example b).

In FIG. 6, the timing of the BS frame is substantially the same as the BS frame timing shown in FIG. 5. Accordingly, that timing will not be discussed in detail again here. The BS frame timing in FIG. 6 differs from that shown in FIG. 5 in that the BS may receive from its locally connected MSs and the RS in either a sequentially third zone of the BS frame or a sequentially fourth zone of the BS frame. Whether the BS receives data symbols from the RS in third or fourth zone of this example may depend on which zone of its frame the RS uses to implement a bidirectional transmit zone, as discussed below.

In the first example (a) of FIG. 6 the second and third rows illustrate a first example embodiment of timing for an RS and MS, where the RS implements a bidirectional transmit zone in a sequentially third zone of its frame. As shown in FIG. 6, the start of the RS frame may be advanced by $T_{RS}$. In an example embodiment, the advancing of the start of the RS frame may be coordinated with the BS in similar fashion as delaying the start of the RS frame, as discussed above with respect to FIG. 5.

In this example, as shown in FIG. 6, a sequentially first zone of the RS frame may include transmitting eleven OFDM symbols to the MS. An idle symbol (to complete two subframes) may be included at the end of the first zone of the RS frame as a TTG between the first zone and a sequentially second zone. In this embodiment, the TTG is increased by a round trip delay between the BS and the RS in order to maintain synchronization with the BS. In the second zone, in this example, the RS may receive eleven OFDM symbols from the BS. An idle symbol (to complete two subframes) may be included at the end of the second zone of the RS frame as an RTG between the second zone and a sequentially third zone. In this example embodiment, the RTG may be decreased by a round trip delay between the BS and the RS in order to maintain synchronization with the BS and the MS.

In this first example of RS frame timing in FIG. 6, the RS may implement a bidirectional transmit zone in a sequentially third zone of its frame. For this example, the RS may transmit eleven OFDM symbols to the BS using a first carrier frequency and, at substantially the same time, transmit eleven OFDM symbols to the MS using a second carrier frequency. For this example, a TTG of one OFDM symbol may be included at the end of the third zone of the RS frame as a transition to a sequentially fourth zone of the RS. In the fourth zone, the RS may receive eleven or twelve symbols from the MS. The number of symbols received may be depend on whether or not an idle symbol is used at the end of the fourth zone, as is shown in FIG. 6.

As illustrated in FIG. 6, for this first example, the MS is instructed not to transmit or receive data symbols in its second zone. The MS is idle in its second zone in order to account for the advancing of the start of the RS frame and the implementation of the bidirectional transmit zone in the third zone of the RS frame. In this example, if the MS was not instructed to be idle in its second zone, the synchronization of the MS frame based on integer multiples of OFDM symbol transmission times would be violated.

The overall timing of the MS frame in this example is not otherwise modified (e.g., for an 802.16 network) other than the shift of the MS frame due to the advancing of the start of RS frame by $T_{RS}$. This shift, however, is transparent to the MS as its timing is relative to the RS frame. Accordingly, for purposes of brevity, the MS frame timing is not discussed in detail here. However, it is noted that the MS knows the propagation delay ($T_{MS}$) between the RS and the MS and may account for this delay in its timing in order to maintain synchronization of the MS frame with the RS based on integer multiples of OFDM symbol transmission times. The MS transmits and receives in each zone of its frame as is shown in the third row of FIG. 6.

For the second example embodiment illustrated in FIG. 6 (example b), the timing of the BS frame is the same as described above. The timing/zoning of the RS is slightly modified as compared to the first example embodiment (example a) discussed above. In the second example (b) of FIG. 6, the RS receives eleven symbols from the MS in the third zone of its frame rather than implementing the bi-direction transmit zone in the third zone. In the second example (b) in FIG. 6, the RS implements a bidirectional transmit zone in the fourth zone of the RS frame. As previously discussed, the RS may transmit eleven or twelve symbols to the MS on a first carrier frequency and eleven or twelve symbols to the BS on a second carrier frequency. The number of symbols transmitted may depend on whether an idle symbol is used for a transition gap at the end of the fourth zone (e.g., as an RTG for the MS and/or the BS).

Figure 7:
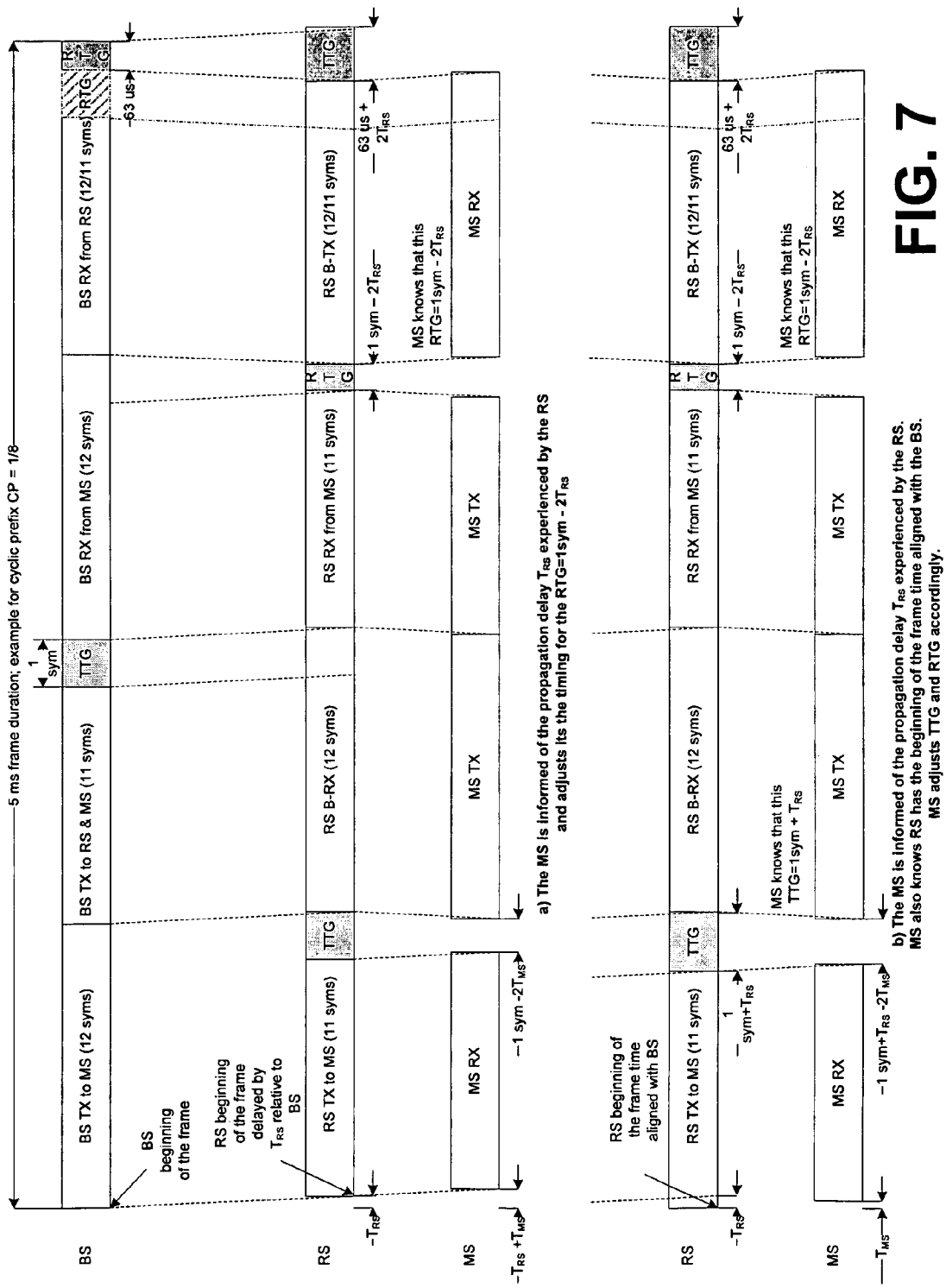
FIG. 7 is a timing diagram illustrating frame synchronization for a relay station implementing a bidirectional transmit zone and a bidirectional receive zone according to two example embodiments.

FIG. 7 is a timing diagram illustrating frame synchronization for a relay station implementing a bidirectional transmit zone and a bidirectional receive zone according to two example embodiments. In similar fashion as FIGS. 5 and 6, FIG. 7 illustrates BS timing in the top row, which is the same for both example embodiments illustrated in FIG. 6. The second and third rows of FIG. 7 illustrate, respectively, RS and MS timing for a first embodiment (example a), while the fourth and fifth rows illustrate respective RS and MS timing for a second embodiment (example b).

In FIG. 7, the timing of the BS frame is substantially the same as the BS frame timing shown in FIG. 5. Accordingly, that timing will not be discussed in detail again here. For a sequentially fourth zone of the BS frame in FIG. 7, the timing diagram indicates that the BS receives data symbols from the RS. In another example embodiment, the BS may also receive data symbols from locally connected MSs, as was discussed above with respect to FIG. 5.

Also in example (a) of FIG. 7, the timing of the first three sequential zones of the RS frame and the MS frame are substantially the same as the corresponding zones in FIG. 5. Accordingly, the timing of the first three zones of the first example (a) will not be described again in detail here.

In the first example of FIG. 7, the RS may instruct the MS that the RTG at the end of the third zone of the RS frame is less than one OFDM symbol in duration (e.g., 1 symbol–$2T_{RS}$). The MS may then adjust its timing to synchronize the reception of data symbols from the RS in the fourth zone. In this first example in FIG. 7, the RS may implement a bidirectional transmit zone in the fourth zone of the RS frame. Thus, this example embodiment illustrates an RS frame that includes both a bidirectional transmit zone and a bidirectional receive zone.

In the second example (b) of FIG. 7, the RS frame timing (and the corresponding MS frame timing) is modified as follows. Instead of delaying the start of the RS frame by a propagation delay between the BS and the RS ($T_{RS}$), the start time of the RS frame is aligned with the start time of the BS frame, as shown in example (b) of FIG. 7. Also, the TTG at the end of the first zone of the RS frame is increased by $T_{RS}$. Further, the MS is instructed that the TTG at the end of the first zone of the RS frame has been increased by $T_{RS}$. The MS may then adjust its frame timing in order to synchronize the MS frame with the RS frame in order to properly implement the bidirectional receive zone in the second zone of the RS frame.

Figure 8:
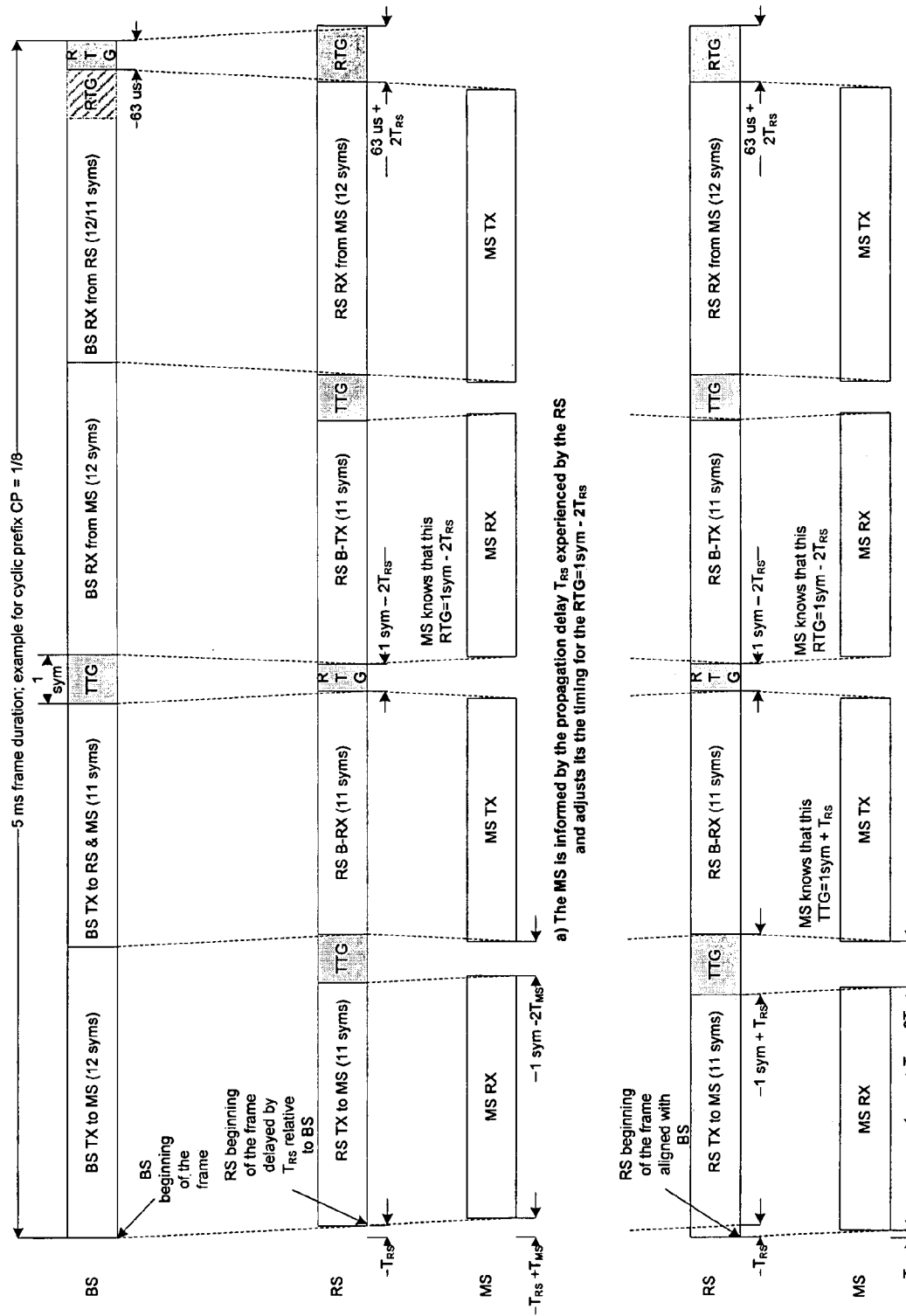
FIG. 8 is a timing diagram illustrating frame synchronization for a relay station implementing a bidirectional transmit zone and a bidirectional receive zone according to two other example embodiments.

FIG. 8 is a timing diagram illustrating frame synchronization for a relay station implementing a bidirectional transmit zone and a bidirectional receive zone according to two other example embodiments. In similar fashion as FIGS. 5, 6 and 7, FIG. 8 illustrates BS timing in the top row, which is the same for both example embodiments illustrated in FIG. 6. The second and third rows of FIG. 8 illustrate, respectively, RS and MS timing for a first embodiment (example a), while the fourth and fifth rows illustrate respective RS and MS timing for a second embodiment (example b).

In FIG. 8, the timing of the BS frame is substantially the same as the BS frame timing shown in FIG. 7. Accordingly, that timing will not be discussed in detail again here. For a sequentially fourth zone of the BS frame in FIG. 8 (as with FIG. 7), the timing diagram indicates that the BS receives data symbols from the RS. As also discussed with respect to FIG. 7, in another example embodiment, the BS frame of FIG. 8 may also include receiving data symbols from locally connected MSs in its fourth zone.

In the first example (a) of FIG. 8, the timing of the first zones of the RS and MS frames is substantially the same as the first zones of the RS and MS frames illustrated in the first example (a) of FIG. 5. The timing of the second, third and fourth zones of the RS frame of the first example (a) in FIG. 8 is substantially the same as the timing of the second third and fourth zones of the first example (a) illustrated in FIG. 6. In FIG. 8, the alternative of using an idle symbol at the end of the frame (e.g., as shown in FIG. 6) is not illustrated, though such an approach may be implemented in an example embodiment.

In the second example (b) of FIG. 8, the MS may be informed, e.g., by the RS, of the change in the TTG between the first zone and the second zone of the RS frame (e.g., an increase of $T_{RS}$). The MS may also be informed, e.g., by the MS, of the change in the RTG between the second zone and third zone of the RS frame (a decrease of $2 T_{RS}$). The MS may then adjust its timing to account for the changes in the TTG and the RTG values, in order to compensate for the various propagation and round trip delays.

Figure 9:
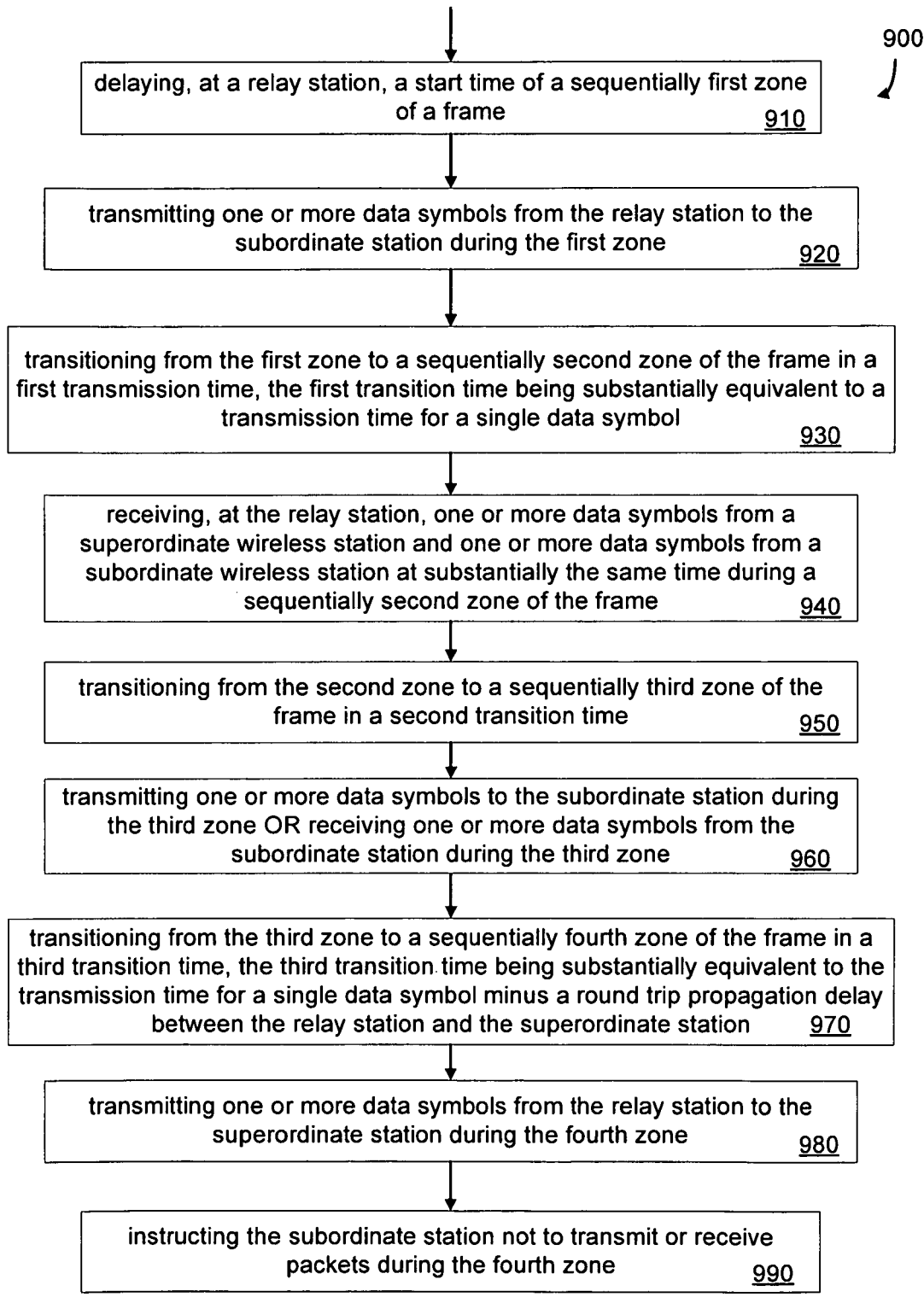
FIG. 9 is a flowchart illustrating a method in accordance with an example embodiment.

FIG. 9 is a flowchart illustrating a method 900 for implementing a bidirectional receive zone in a relay station. The flowchart illustrated in FIG. 9 corresponds with the timing diagrams illustrated in FIG. 5. The discussion of FIG. 9 may be better understood with further reference to FIG. 5.

The method 900 may include, at block 910, delaying, at a relay station, a start time of a frame. In an example embodiment, delaying the start time of the RS frame may include delaying the start of a sequentially first zone of the RS frame, such as the first zone shown in FIG. 5. At block 920, the method 900 may include transmitting one or more data symbols from the relay station to the subordinate station during the first zone.

At block 930, the method 900 includes transitioning from the first zone to a sequentially second zone of the frame in a first transition time. In an example embodiment, the first transition time may be substantially equivalent to a transmission time for a single data symbol (e.g., an idle symbol in a subframe). At block 940, the method 900 may include receiving one or more data symbols from a superordinate wireless station and one or more data symbols from a subordinate wireless station at substantially the same time during the second zone.

At block 950, the method 900 may include transitioning from the second zone to a sequentially third zone of the frame in a second transition time. In an example embodiment, the second transition time, at block 950, may be substantially equivalent to zero and the relay station may receive, at block 960, one or more data symbols from the subordinate station during the third zone. In yet another embodiment, the second transition time, at block 950, may be substantially equivalent to the transmission time for a single data symbol and the relay station may, at block 960, transmit one or more data symbols to the subordinate station during the third zone. Of course, other arrangements are possible.

At block 970, the method 900 may include, transitioning from the third zone to a sequentially fourth zone of the frame in a third transition time. In an example embodiment, the third transition time may be substantially equivalent to the transmission time for a single data symbol minus a round trip propagation delay between the relay station and the superordinate station. The method 900 may further include, at block 980, transmitting one or more data symbols from the relay station to the superordinate station during the fourth zone. At block 990, the method 900 may further include instructing the subordinate station not to transmit or receive packets during the fourth zone. Therefore, in such an embodiment, the MS may be idle during the fourth zone of the MS frame (and the RS frame).

Figure 10:
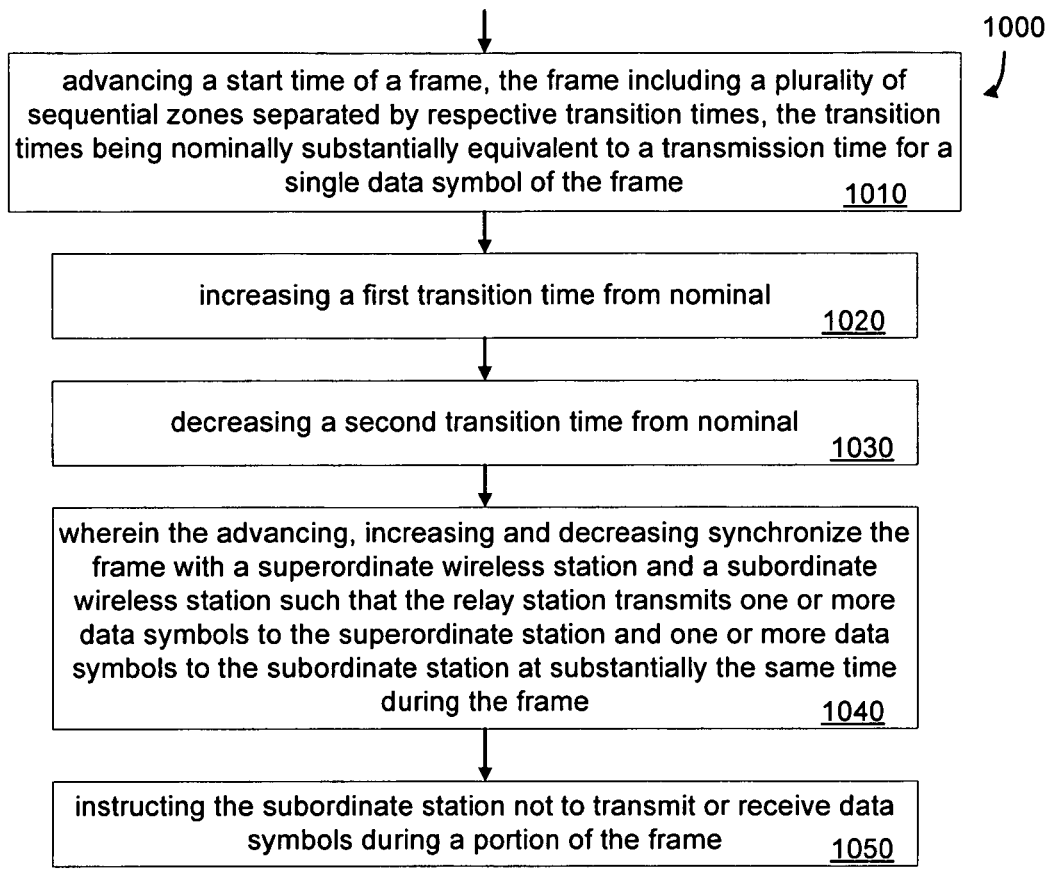
FIG. 10 is a flowchart illustrating a method in accordance with another example embodiment.

FIG. 10 is a flowchart illustrating a method 1000 in accordance with another example embodiment. The method 1000, at block 1010, includes advancing, at a relay station, a start time of a frame. In an example embodiment, the frame may include a plurality of sequential zones separated by respective transition times, where the transition times may be nominally substantially equal to a transmission time for a single data symbol. In an example embodiment, advancing the start time includes advancing a sequentially first zone of the frame by a first period of time. The first period of time, in one more embodiments, may correspond with a propagation delay between the RS and a superordinate station.

The method 1000 further includes, at block 1020, increasing a first transition time from nominal (e.g., by a round trip delay between the RS and the superordinate station). In an example embodiment, increasing the first transition time includes increasing a transition time between the first zone and a sequentially second zone of the frame by a second period of time. The second period of time may be substantially equivalent with a round trip delay between the relay station and the superordinate station.

The method 1000 also includes, at block 1030, decreasing a second transition time from nominal (e.g., by a round trip delay between the RS and the superordinate station). In an example embodiment, decreasing the second transition time includes decreasing a transition time between the second zone and a sequentially third zone of the frame by the second period of time. As discussed above, the second period of time may be substantially equivalent with a round trip delay between the relay station and the superordinate station.

In the method 1000, at block 1040, the advancing, increasing and decreasing may synchronize the frame with the superordinate wireless station and a subordinate wireless station such that the RS transmits one or more data symbols to the superordinate station and one or more data symbols to the subordinate station at substantially the same time during the frame. In an example embodiment, the RS may transmit the one or more symbols to the superordinate station and the one or more symbols to the subordinate station at substantially the same time during the third zone. In another example embodiment, the relay station may transmit the one or more symbols to the superordinate station and the one or more symbols to the subordinate station at substantially the same time during a sequentially fourth zone of the frame; where the third zone and the fourth zone are separated by a nominal transition time (e.g., one OFDM symbol transmission duration).

The method 1000, at block 1050, may further comprise instructing the subordinate station not to transmit or receive data symbols (e.g., remain idle) during a portion of the frame. In an example embodiment, the RS may instruct the subordinate station (e.g., MS or RS) to remain idle during the second zone of the MS's frame.

Figure 11:
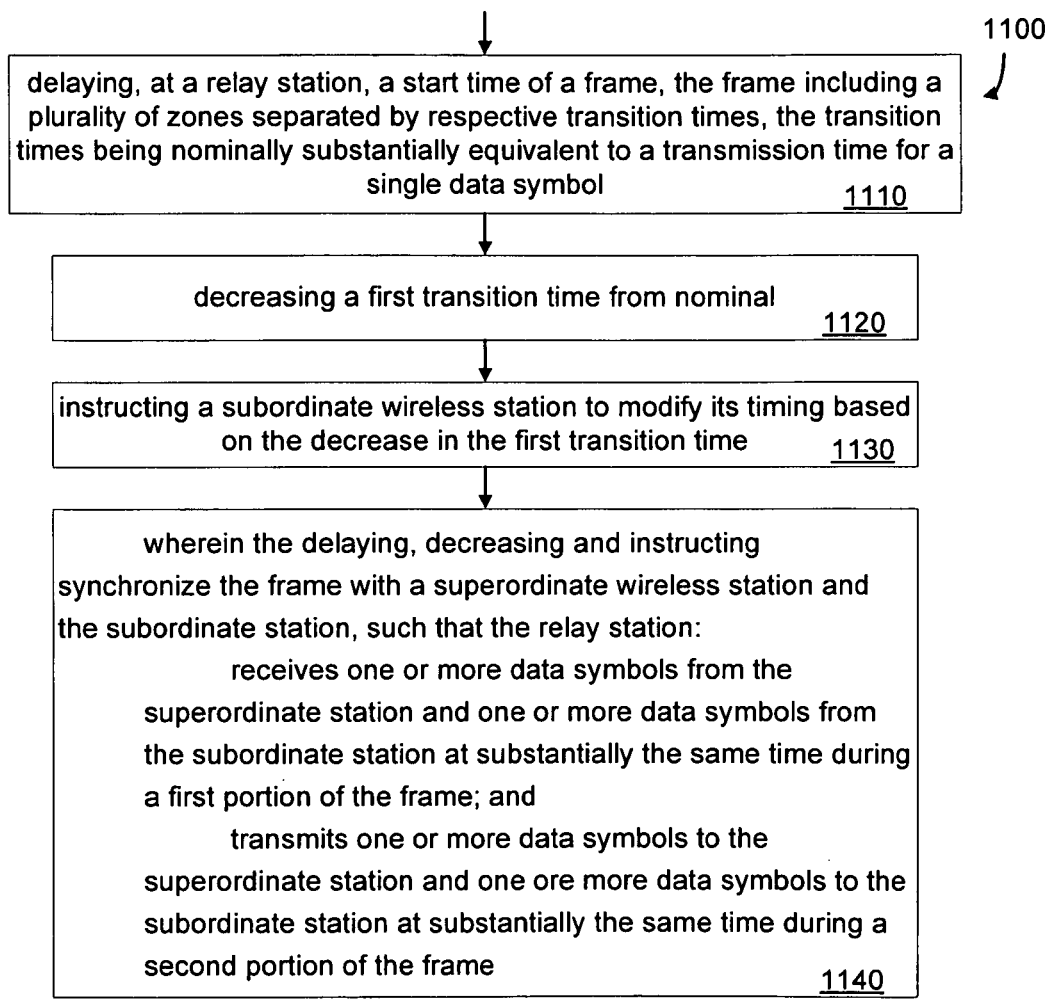
FIG. 11 is a flowchart illustrating a method in accordance with yet another example embodiment.

FIG. 11 is a flowchart illustrating a method 1100 in accordance with yet another example embodiment. The method 1100 may include, at block 1110, delaying, at a relay station, a start time of a frame. In an example embodiment, the frame may include a plurality of zones separated by respective transition times, where the transition times are nominally substantially equal to a transmission time for a single data symbol (e.g., an OFDM symbol).

The method 1100 may further include, at block 1120, decreasing a first transition time from nominal (e.g., by a round trip delay between the RS and a superordinate wireless station). The method 1100 may also include, at block 1130, instructing a subordinate wireless station to modify its timing based on the decrease in the first transition time. In an example embodiment, instructing the subordinate station may include providing, to the subordinate station, a time period corresponding with the decrease in the first transition time. In another example embodiment, instructing the subordinate station may include providing, to the subordinate station, a time period corresponding with the decreased first transition time.

In the method 1100, at block 1140, the delaying, decreasing and instructing may synchronize the frame with the superordinate wireless station and the subordinate station, such that the relay station receives one or more data symbols from the superordinate station and one or more data symbols from the subordinate station at substantially the same time during a first portion of the frame. Also at block 1140, the delaying, decreasing and instructing may synchronize the frame with the superordinate wireless station and the subordinate station, such that the relay station transmits one or more data symbols to the superordinate station and one or more data symbols to the subordinate station at substantially the same time during a second portion of the frame.

In an example embodiment, the first portion may be a sequentially second zone of the frame; the second portion may be a sequentially third zone of the frame and the first transition time may separate the second zone and the third zone. In another example embodiment, the first portion may be a sequentially second zone of the frame, the second portion may be a sequentially fourth zone of the frame and the first transition time may separate a sequentially third zone and the fourth zone.

Figure 12:
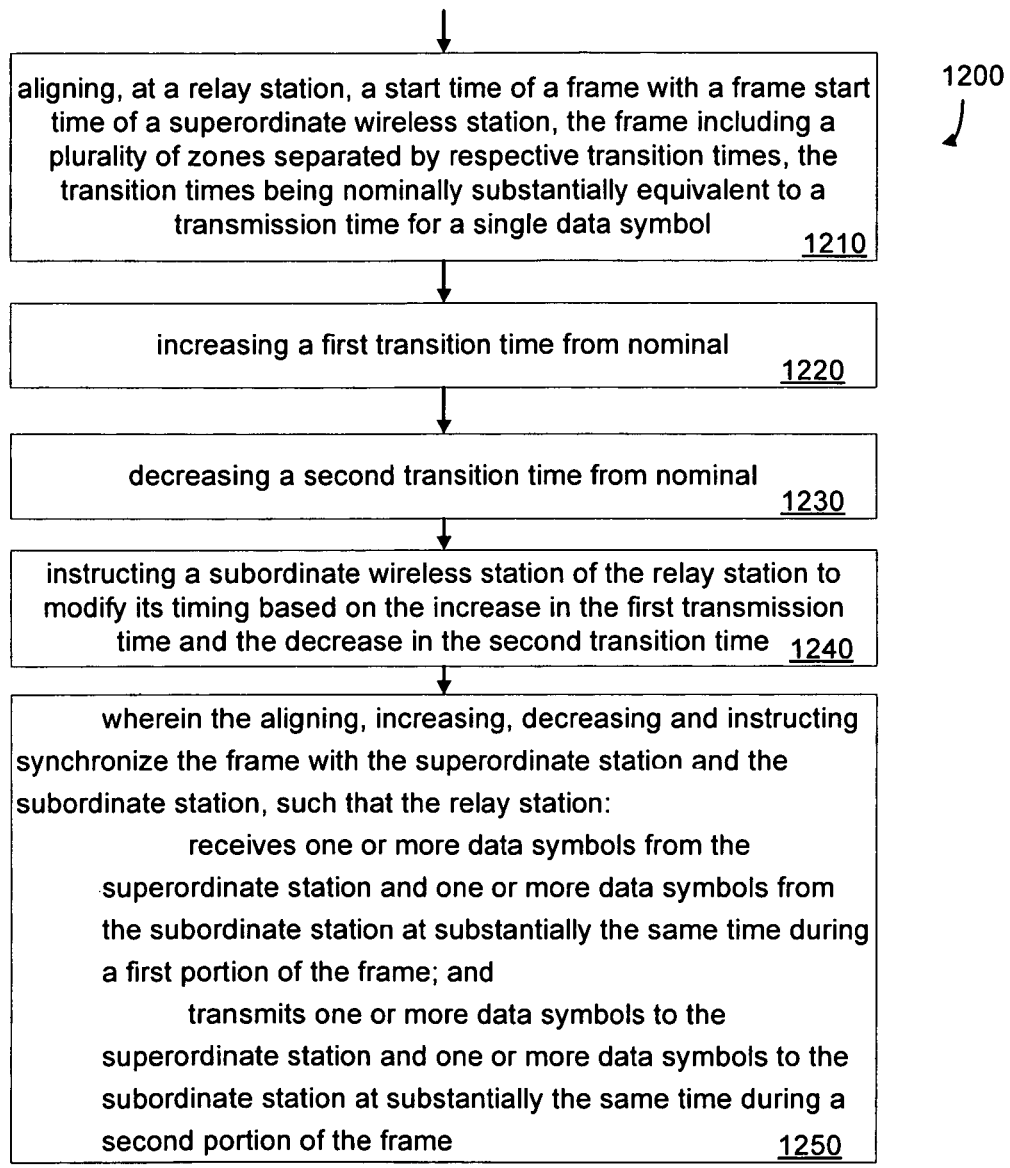
FIG. 12 is a flowchart illustrating a method in accordance with still another example embodiment.

FIG. 12 is a flowchart illustrating a method 1200 in accordance with still another example embodiment. The method 1200 may include, at block 1210, aligning, at a relay station, a start time of a frame with a frame start time of a superordinate wireless station. In an example embodiment, the frame may include a plurality of zones separated by respective transition times, where the transition times may be nominally substantially equivalent to a transmission time for a single data symbol (e.g., an OFDM data symbol).

The method 1200 may include, at block 1220, increasing a first transition time from nominal (e.g., by a propagation delay between the RS and the superordinate station). The method 1200 may further include, at block 1230, decreasing a second transition time from nominal (e.g., by a round trip delay between the RS and the superordinate station).

The method 1200 may also include, at block 1240, instructing a subordinate wireless station of the RS to modify its timing based on the increase in the first transition time and the decrease in the second transition time. In an example embodiment, the increase in the first transition time and the decrease in the second transition time may be provided to the subordinate station as respective increase and decrease values. In another example embodiment, the increase in the first transition time and the decrease in the second transition time may be provided to the subordinate station as respective increased and decreased transition times.

In the method 1200, at block 1250, the aligning, increasing, decreasing and instructing may synchronize the RS frame with the superordinate station and the subordinate station, such that the relay station receives one or more data symbols from the superordinate station and one or more data symbols from the subordinate station at substantially the same time during a first portion of the frame. The aligning, increasing, decreasing and instructing, at block 1250, may also synchronize the RS frame with the superordinate station and the subordinate station, such that the relay station transmits one or more data symbols to the superordinate station and one or more data symbols to the subordinate station at substantially the same time during a second portion of the frame.

In an example embodiment, the first portion, at block 1250, may be a sequentially second zone of the frame, the second portion may be a sequentially third zone of the frame, the first transition time may separate a sequentially first zone of the frame and the second zone and the second transition time may separate the second zone and the third zone. In another example embodiment the first portion may be a sequentially second zone of the frame, the second portion may be a sequentially fourth zone of the frame, the first transition time may separate a sequentially first zone of the frame and the second zone and the second transition time may separate a sequentially third zone of the frame and the fourth zone.

Figure 13:
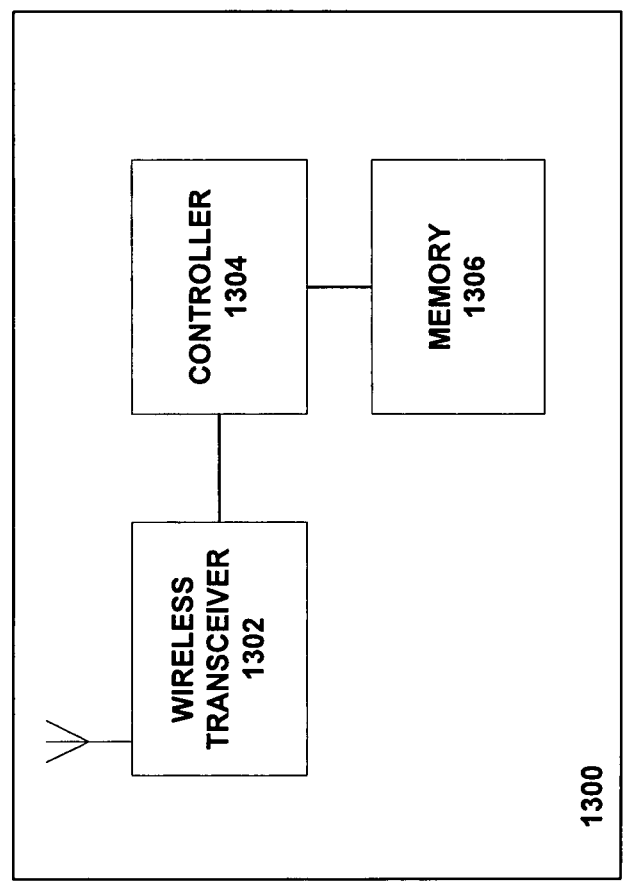
FIG. 13 is a block diagram illustrating an apparatus that may be provided in a wireless device according to an example embodiment.

FIG. 13 is a block diagram illustrating an apparatus 1300 that may be provided in a wireless station according to an example embodiment. The wireless station may include, for example, a wireless transceiver 1302 configured to transmit and receive signals, and a controller 1304 coupled with the wireless transceiver 1302, the controller 1304 being configured to control operation of the station and execute instructions or software. The apparatus 1300 may also include a memory 1306 couple with the controller 1034, where the memory is configured to store data and/or instructions. The controller 1304 may be programmable and configured to execute software or other instructions stored in memory 1306, or on any other computer readable storage media to perform the various tasks and functions described above. In addition, a storage medium (not shown) may be provided that includes stored instructions that, when executed by the controller 1304 or other processor, may result in the controller 1304 or processor performing one or more of the functions or tasks described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
delaying, by a wireless relay station, a start time of a frame, such that the wireless relay station receives one or more data symbols from a superordinate wireless station and one or more data symbols from a subordinate wireless station at a same time during the frame,
wherein the delaying of the start time of the frame prevents violations of a time division duplex synchronization when receiving the one or more data symbols from the superordinate wireless station and the one or more data symbols from the subordinate wireless station at the same time during the frame.

2. The method of claim 1, wherein delaying the start time of the frame includes delaying a sequentially first zone of the frame by a first period of time, the first period of time corresponding with a propagation delay between the wireless relay station and the superordinate wireless station.

3. The method of claim 2, wherein the wireless relay station receives the one or more data symbols from the superordinate wireless station and the one or more data symbols from the subordinate wireless station during a sequentially second zone of the frame.

4. The method of claim 1, wherein:
the frame includes a plurality of zones, the zones being separated by respective transition times; and
delaying the start time of the frame includes delaying a sequentially first zone of the frame by a first period of time, the first period of time corresponding with a propagation delay between the wireless relay station and the superordinate wireless station,
the method further comprising:
transmitting one or more data symbols from the wireless relay station to the subordinate wireless station during the first zone;
transitioning from the first zone to a sequentially second zone of the frame in a first transmission time, the first transition time being equivalent to a transmission time for a single data symbol;
receiving the one or more data symbols from the superordinate wireless station and the one or more data symbols from the subordinate wireless station during the second zone;
transitioning from the second zone to a sequentially third zone of the frame in a second transition time;
transitioning from the third zone to a sequentially fourth zone of the frame in a third transition time, the third transition time being equivalent to the transmission time for a single data symbol minus a round trip propagation delay between the wireless relay station and the superordinate wireless station; and
transmitting one or more data symbols from the wireless relay station to the superordinate wireless station during the fourth zone.

5. The method of claim 4, wherein:
the second transition time is equivalent to zero; and
the wireless relay station receives one or more data symbols from the subordinate station during the third zone.

6. The method of claim 4, wherein:
the second transition time is equivalent to a transmission time for a single data symbol; and
the wireless relay station transmits one or more data symbols to the subordinate wireless station during the third zone.

7. The method of claim 4, further comprising instructing the subordinate wireless station not to transmit or receive packets during the fourth zone.

8. The method of claim 1, wherein the superordinate wireless station is one of a base station and another wireless relay station.

9. The method of claim 1, wherein the subordinate wireless station is one of a mobile station and another wireless relay station.

10. The method of claim 1, further comprising instructing the subordinate wireless station not to transmit or receive data symbols during a portion of the frame.

11. A method comprising: at a wireless relay station:
delaying, by the wireless relay station, a start time of a frame; and
receiving, by the wireless relay station, one or more data symbols from a superordinate wireless station and one or more data symbols from a subordinate wireless station at a same time during the frame,
wherein the delaying of the start time of the frame prevents violations of a time division duplex synchronization when receiving the one or more data symbols from the superordinate wireless station and the one or more data symbols from the subordinate wireless station at the same time during the frame.

12. The method of claim 11, further comprising:
reducing, from a nominal time, a transition time between two sequential zones of the frame, so as to synchronize transmission of one or more data symbols from the wireless relay station to the superordinate wireless station and one or more data symbols to the subordinate wireless station during a sequentially second zone of the two sequential zones.

13. A method comprising:
advancing, by a wireless relay station, a start time of a frame, the frame including a plurality of sequential zones separated by respective transition times, the transition times being nominally equivalent to a transmission time for a single data symbol;
increasing a first transition time from nominal; and
decreasing a second transition time from nominal,
wherein:
the advancing, increasing and decreasing synchronize the frame with a superordinate wireless station and a subordinate wireless station such that the wireless relay station transmits one or more data symbols to the superordinate wireless station and one or more data symbols to the subordinate wireless station at the same time during the frame; and
the advancing, increasing and decreasing prevents violations of a time division duplex synchronization when transmitting the one or more data symbols to the superordinate wireless station and the one or more data symbols to the subordinate wireless station at the same time during the frame.

14. The method of claim 13, wherein:
advancing the start time includes advancing a sequentially first zone of the frame by a first period of time, the first period of time corresponding with a propagation delay between the wireless relay station and the superordinate wireless station;
increasing the first transition time includes increasing a transition time between the first zone and a sequentially second zone of the frame by a second period of time, the second period of time being equivalent with a round trip delay between the wireless relay station and the superordinate wireless station; and decreasing the second transition time includes decreasing a transition time between the second zone and a sequentially third zone of the frame by the second period of time.

15. The method of claim 13, wherein:
advancing the start time includes advancing a sequentially first zone of the frame by a first period of time, the first period of time corresponding with a propagation delay between the wireless relay station and the superordinate wireless station;
the first transition time occurs between the first zone and a sequentially second zone of the frame; and
the second transition time occurs between the second zone and a sequentially third zone of the frame.

16. The method of claim 15, wherein the wireless relay station transmits the one or more symbols to the superordinate wireless station and the one or more symbols to the subordinate wireless station at a same time during the third zone.

17. The method of claim 15, wherein:
the wireless relay station transmits the one or more symbols to the superordinate wireless station and the one or more symbols to the subordinate wireless station at a same time during a sequentially fourth zone of the frame; and
the third zone and the fourth zone are separated by a nominal transition time.

18. The method of claim 15, further comprising instructing the wireless subordinate station not to transmit or receive data symbols during the second zone.

19. The method of claim 13, further comprising instructing the subordinate wireless station not to transmit or receive data symbols during a portion of the frame.

20. A method comprising, at a wireless relay station:
delaying, by the wireless relay station, a start time of a frame, the frame including a plurality of zones separated by respective transition times, the transition times being nominally equivalent to a transmission time for a single data symbol;
decreasing a first transition time from nominal; and
instructing a subordinate wireless station to modify its timing based on the decrease in the first transition time,
wherein:
the delaying, decreasing and instructing synchronize the frame with a superordinate wireless station and the subordinate wireless station, such that the wireless relay station:
receives one or more data symbols from the superordinate wireless station and one or more data symbols from the subordinate wireless station at the same time during a first portion of the frame; and
transmits one or more data symbols to the superordinate wireless station and one or more data symbols to the subordinate wireless station at a same time during a second portion of the frame; and
the delaying, decreasing and instructing prevents violations of a time division duplex synchronization when:
receiving the one or more data symbols from the superordinate wireless station and the one or more data symbols from the subordinate wireless station at the same time during the first portion of the frame; and
transmitting the one or more data symbols to the superordinate wireless station and the one or more data symbols to the subordinate wireless station at the same time during second portion of the frame.

21. The method of claim 20, wherein:
the first portion is a sequentially second zone of the frame;
the second portion is a sequentially third zone of the frame; and
the first transition time separates the second zone and the third zone.

22. The method of claim 20, wherein:
the first portion is a sequentially second zone of the frame;
the second portion is a sequentially fourth zone of the frame; and
the first transition time separates a sequentially third zone and the fourth zone.

23. The method of claim 20, wherein instructing the subordinate wireless station includes providing, to the subordinate wireless station, a time period corresponding with the decrease in the first transition time.

24. The method of claim 20, wherein instructing the subordinate wireless station includes providing, to the subordinate wireless station, a time period corresponding with the decreased first transition time.

25. A method comprising, in a wireless relay station:
aligning, by the wireless relay station, a start time of a frame with a frame start time of a superordinate wireless station, the frame including a plurality of zones separated by respective transition times, the transition times being nominally equivalent to a transmission time for a single data symbol;
increasing a first transition time from nominal;
decreasing a second transition time from nominal; and
instructing a subordinate wireless station of the relay station to modify its timing based on the increase in the first transition time and the decrease in the second transition time,
wherein:
the aligning, increasing, decreasing and instructing synchronize the frame with the superordinate wireless station and the subordinate wireless station, such that the wireless relay station:
receives one or more data symbols from the superordinate wireless station at a same time during a first portion of the frame; and
transmits one or more data symbols to the superordinate wireless station and one or more data symbols to the subordinate wireless station at the same time during a second portion of the frame; and
the aligning, increasing, decreasing and instructing prevents violations of a time division duplex synchronization when:
receiving the one or more data symbols from the superordinate wireless station and the one or more data symbols from the subordinate wireless station at the same time during the first portion of the frame; and
transmitting the one or more data symbols to the superordinate wireless station and the one or more data symbols to the subordinate wireless station at the same time during second portion of the frame.

26. The method of claim 25, wherein:
the first portion is a sequentially second zone of the frame;
the second portion is a sequentially third zone of the frame;
the first transition time separates a sequentially first zone of the frame and the second zone; and
the second transition time separates the second zone and the third zone.

27. The method of claim 25, wherein:
the first portion is a sequentially second zone of the frame;
the second portion is a sequentially fourth zone of the frame;
the first transition time separates a sequentially first zone of the frame and the second zone; and
the second transition time separates a sequentially third zone of the frame and the fourth zone.

28. The method of claim 25, wherein instructing the subordinate wireless station includes providing, to the subordinate wireless station:
a first time period corresponding with the increase in the first transition time; and
a second time period corresponding with the decrease in the second transition time.

29. The method of claim 25, wherein instructing the subordinate wireless station includes providing, to the subordinate wireless station,
a first time period corresponding with the increased first transition time; and
a second time period corresponding with the decreased second transition time.

30. An apparatus comprising:
a wireless transceiver;
a controller operatively coupled with the wireless transceiver; and
a memory operatively coupled with the controller,
wherein the wireless transceiver, the controller and the memory are collectively configured to:
delay a start time of a frame, such that the apparatus receives one or more data symbols from a superordinate wireless station and one or more data symbols from a subordinate wireless station at a same time during the frame,
wherein the delaying of the start time of the frame prevents violations of a time division duplex synchronization when receiving the one or more data symbols from the superordinate wireless station and the one or more data symbols from the subordinate wireless station at a same time during the frame.

31. An apparatus comprising:
a wireless transceiver;
a controller operatively coupled with the wireless transceiver; and
a memory operatively coupled with the controller,
wherein the wireless transceiver, the controller and the memory are collectively configured to:
advance a start time of a frame, the frame including a plurality of sequential zones separated by respective transition times, the transition times being nominally equivalent to a transmission time for a single data symbol;
increase a first transition time from nominal; and
decrease a second transition time from nominal,
wherein:
the advancing, increasing and decreasing synchronize the frame with a superordinate wireless station and a subordinate wireless station such that the apparatus transmits one or more data symbols to the superordinate wireless station and one or more data symbols to the subordinate wireless station at a same time during the frame; and
the advancing, increasing and decreasing prevents violations of a time division duplex synchronization when transmitting the one or more data symbols to the superordinate wireless station and the one or more data symbols to the subordinate wireless station at the same time during the frame.

32. An apparatus comprising:
a wireless transceiver;
a controller operatively coupled with the wireless transceiver; and
a memory operatively coupled with the controller,
wherein the wireless transceiver, the controller and the memory are collectively configured to:
align a start time of a frame with a frame start time of a superordinate wireless station, the frame including a plurality of zones separated by respective transition times, the transition times being nominally equivalent to a transmission time for a single data symbol;
increase a first transition time from nominal;
decrease a second transition time from nominal; and
instruct a subordinate wireless station to modify its timing based on the increase in the first transmission time and the decrease in the second transition time,
wherein:
the aligning, increasing, decreasing and instructing synchronize the frame with the superordinate wireless station and the subordinate wireless station such that the apparatus:
receives one or more data symbols from the superordinate wireless station and one or more data symbols from the subordinate wireless station at substantially a same time during a first portion of the frame; and
transmits one or more data symbols to the superordinate wireless station and one or more data symbols to the subordinate wireless station at a same time during a second portion of the frame; and
the aligning, increasing, decreasing and instructing prevents violations of a time division duplex synchronization when:
receiving the one or more data symbols from the superordinate wireless station and the one or more data symbols from the subordinate wireless station at the same time during the first portion of the frame; and
transmitting the one or more data symbols to the superordinate wireless station and the one or more data symbols to the subordinate wireless station at the same time during second portion of the frame.

* * * * *

UNITED STATES PATENT AND TRADEMARK OFFICE
CERTIFICATE OF CORRECTION

PATENT NO. : 8,724,525 B2  Page 1 of 1
APPLICATION NO. : 12/204789
DATED : May 13, 2014
INVENTOR(S) : Boariu et al.

It is certified that error appears in the above-identified patent and that said Letters Patent is hereby corrected as shown below:

On the Title page, in Item [54] and in the Specification, Column 1, line 2, "Title", delete "TRANSIT" and insert -- TRANSMIT --, therefor.

In the Claims

Column 19, line 40, claim 30, delete "a" and insert -- the --, therefor.

Signed and Sealed this
Twenty-ninth Day of July, 2014

Michelle K. Lee
*Deputy Director of the United States Patent and Trademark Office*